US012435527B2

(12) United States Patent
Esh et al.

(10) Patent No.: US 12,435,527 B2
(45) Date of Patent: Oct. 7, 2025

(54) BATTERY POWERED HAND-OPERATED TROWELING MACHINE

(71) Applicant: S.K.E. Masonry, Christiana, PA (US)

(72) Inventors: Samuel K. Esh, Quarryville, PA (US); David King, Paradise, PA (US)

( * ) Notice: Subject to any disclaimer, the term of this patent is extended or adjusted under 35 U.S.C. 154(b) by 306 days.

(21) Appl. No.: 17/900,609

(22) Filed: Aug. 31, 2022

(65) Prior Publication Data

US 2023/0250651 A1 Aug. 10, 2023

Related U.S. Application Data

(60) Provisional application No. 63/307,294, filed on Feb. 7, 2022.

(51) Int. Cl.
*E04F 21/24* (2006.01)
*F16H 1/28* (2006.01)

(52) U.S. Cl.
CPC ......... *E04F 21/248* (2013.01); *F16H 1/2854* (2013.01); *F16H 1/28* (2013.01); *F16H 2001/2872* (2013.01)

(58) Field of Classification Search
CPC ........ E04F 21/248; E04F 21/244; E01C 19/42
See application file for complete search history.

(56) References Cited

U.S. PATENT DOCUMENTS

| | | | | | |
|---|---|---|---|---|---|
| 2,882,806 | A * | 4/1959 | Thieme | E04F 21/248 | 404/112 |
| 5,372,452 | A * | 12/1994 | Hodgson | E04F 21/248 | 404/112 |
| 7,018,132 | B2 * | 3/2006 | Ewer | E04F 21/248 | 404/112 |
| 10,584,499 | B2 | 3/2020 | DelReal et al. | | |
| 2019/0006980 | A1 * | 1/2019 | Sheeks | H01M 10/4207 | |
| 2022/0268036 | A1 * | 8/2022 | Richards | E04F 21/248 | |

FOREIGN PATENT DOCUMENTS

| | | | | |
|---|---|---|---|---|
| CN | 112459497 A * | 3/2021 | | E04F 21/245 |
| WO | WO-2013043117 A1 * | 3/2013 | | E04F 21/247 |

* cited by examiner

*Primary Examiner* — Sherry L Estremsky
(74) *Attorney, Agent, or Firm* — Miller Law Group, PLLC

(57) ABSTRACT

A battery-powered troweling machine is driven by an electric motor powered by a pair of twenty-four volt batteries coupled in series to drive a planetary gearbox to rotate a trowel blade assembly engageable with the surface of the poured concrete. The controls are carried by a detachable handle that is connectable with a receiver box that traps the handle between interior and exterior stops and uses over center clamps to maintain the handle in proper position within the receiver box. The controls at the rearward distal end of the handle can be used to vary the speed of rotation of the troweling assembly, to adjust the pitch of the individual trowel blades through an actuator and linkage assembly, to initiate actuation of the electric motor and to provide an emergency stop for the operation of the troweling machine.

17 Claims, 12 Drawing Sheets

BATTERY POWERED HAND-OPERATED TROWELING MACHINE

CROSS-REFERENCE TO RELATED APPLICATIONS

This application claims domestic priority on U.S. Provisional Patent Application Ser. No. 63/307,294, filed on Feb. 7, 2022, the content of which is incorporated herein by reference.

FIELD OF THE INVENTION

This invention relates generally to hand-operated troweling machines for finishing the surface of poured concrete, such as concrete floors and, more particularly, to a battery powered, environmentally friendly, troweling machine.

BACKGROUND OF THE INVENTION

Hand operated troweling machines have been utilized for decades to finish poured concrete, particularly concrete floors. The machines are typically powered by a gasoline engine that drives a blade assembly around the vertical drive axis to smooth the surface of recently poured concrete. For operation in a closed structure, such as a newly poured concrete floor in the basement of an existing building structure, the exhaust of the gasoline engine has sufficient carbon dioxide to make the operator ill. Providing battery power for the operation of a troweling machine has not been an effective solution, as conventional battery life does not last sufficiently to complete the finishing process for a poured concrete floor. In addition, conventional battery power does not provide sufficient torque to provide a satisfactorily finished floor surface. One known existing battery powered troweling machine drives the blade assembly through a belt drive in the same manner as rotational power is delivered to the blade assembly from a standard gasoline engine.

A self-propelled riding version of a troweling machine is disclosed in U.S. Pat. No. 10,584,499, granted on Mar. 10, 2020, to Multiquip, Inc. In such large, self-propelled troweling machines, the power source is usually a gasoline or diesel engine having at least 70 horsepower as the troweling machine will weigh in excess of 2000 pounds. In this Multiquip patent, a hybrid drive mechanism is disclosed, but still utilizes a large engine that burns carbon-based fuel.

It would be desirable to provide a battery powered hand-operated troweling machine that would provide adequate torque for properly finishing a poured concrete floor and sufficient battery life to permit operation of the troweling machine for a sufficient length of time to complete the finishing of a recently poured concrete floor.

SUMMARY OF THE INVENTION

It is an object of this invention to overcome the disadvantages of the prior art by providing a battery-powered troweling machine for smoothing the surface of poured concrete.

It is another object of this invention to provide a battery-powered troweling machine that provides an adequate amount of torque for operably finishing a poured concrete floor with a sufficient battery life to maintain operations for the day.

It is a feature of this invention to provide a control mechanism that is conveniently accessed by the operator to change the desired speed of operation of the troweling machine and the pitch of the individual trowel blades.

It is an advantage of this invention that the desired speed of operation of the blade assembly can be selected by rotating a rotary knob on an accessible control panel and then engaging a pivoted pad supported adjacent to the control panel.

It is another advantage of this invention that the pitch of the individual troweling blades can be easily changed by a manipulation of a toggle switch on the control panel adjacent the speed control knob.

It is another feature of this invention that the output power of the electric motor powered by batteries is run through a planetary gearbox.

It is yet another advantage of this invention that the output shaft of the electric motor is formed with a pinion on the distal end thereof for engagement with a ring gear within the gear box.

It is still another advantage of this invention that the ring gear includes a spur gear that drives the rotation of multiple planet gears engaged with a fixed sun gear to force the rotation of the drive shaft projecting from the gear box to power rotation of the trowels.

It is still another feature of this invention that the controls are mounted on a handle detachable from the body of the troweling machine.

It is an advantage of this invention that the handle is formed with an L-shaped bracket that is received within a box-like receiver formed with interior and exterior stops and a pair of over center clamps.

It is still another advantage of this invention that the L-shaped bracket fits between the interior and exterior stops and is then clamped into position for operation of the troweling machine by the over center clamps.

It is yet another advantage of this invention that the controls mounted on the handle can be operably coupled to the troweling machine by a detachable plug carried by the handle engaged with a mating receiver.

It is still another object of this invention to provide a battery-powered troweling machine for smoothing the surface of poured concrete that is easy to operate, convenient to transport from one job site to another, and simple and effective in use.

These and other objects, features and advantages are accomplished according to the instant invention by providing a battery-powered troweling machine having an electric motor powered by a pair of twenty-four volt batteries coupled in series to drive a planetary gearbox that rotates a trowel blade assembly engageable with the surface of the poured concrete. The controls are carried by a detachable handle that is connectable with a receiver box that traps the handle between interior and exterior stops and uses over center clamps to maintain the handle in proper position within the receiver box. The controls at the rearward distal end of the handle can be used to vary the speed of rotation of the troweling assembly, to adjust the pitch of the individual trowel blades through an actuator and linkage assembly, to initiate actuation of the electric motor and to provide an emergency stop for the operation of the troweling machine.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENTS

Figure 1:
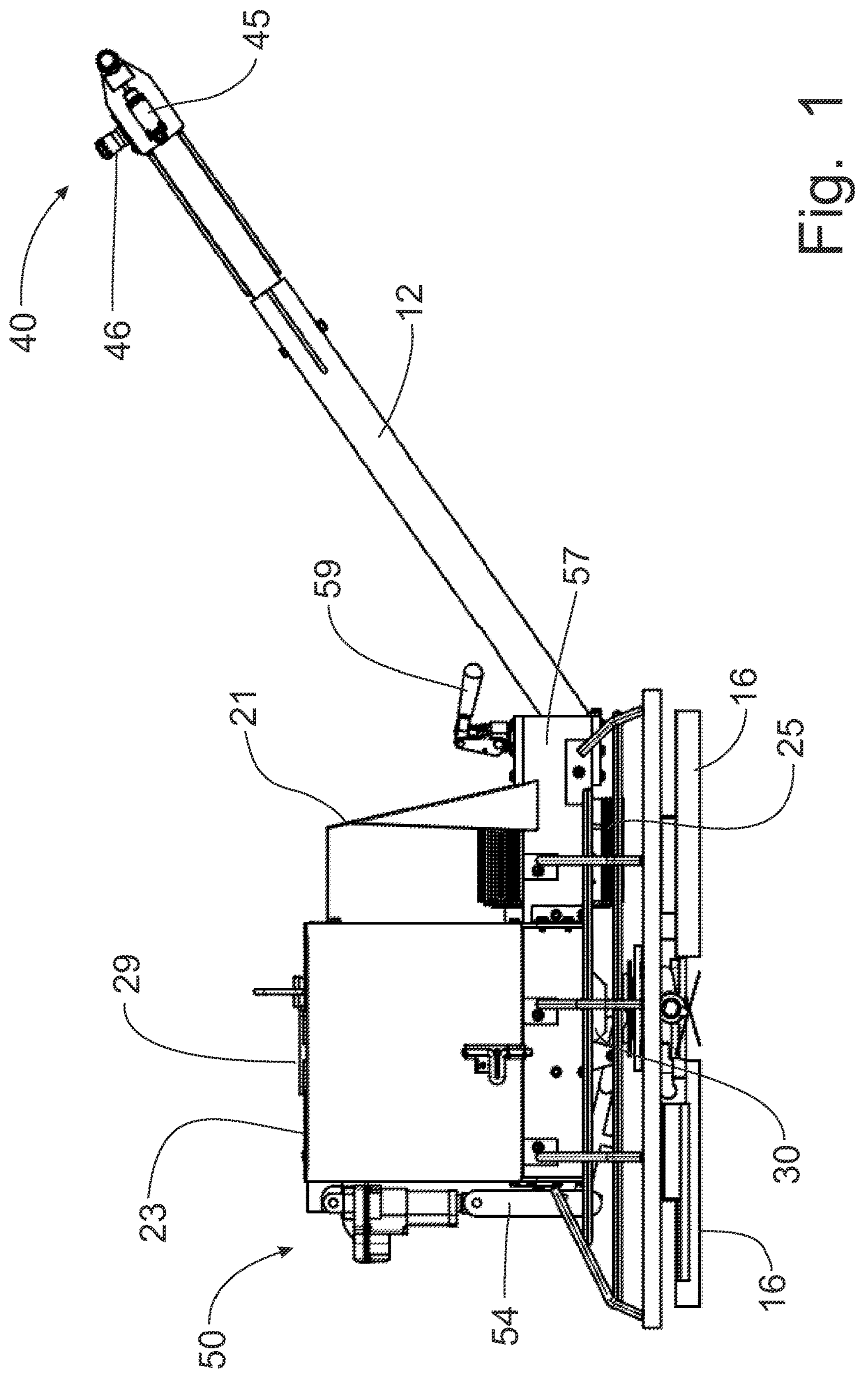
FIG. 1 is a left side elevational view of a battery powered hand-operated troweling machine incorporating the principles of the instant invention.
Figure 2:
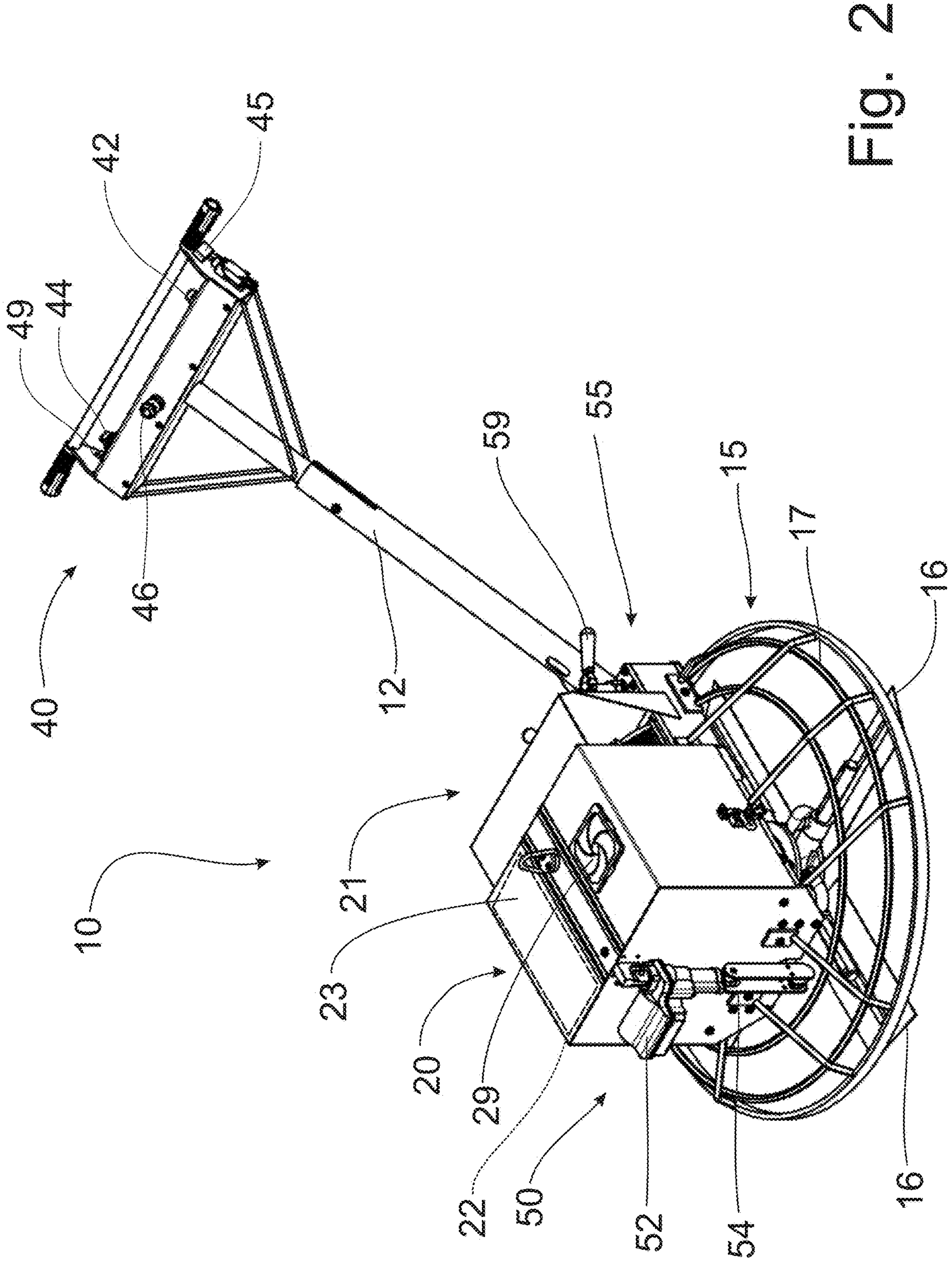
FIG. 2 is a front, left perspective view of the troweling machine shown in FIG. 1.
Figure 3:
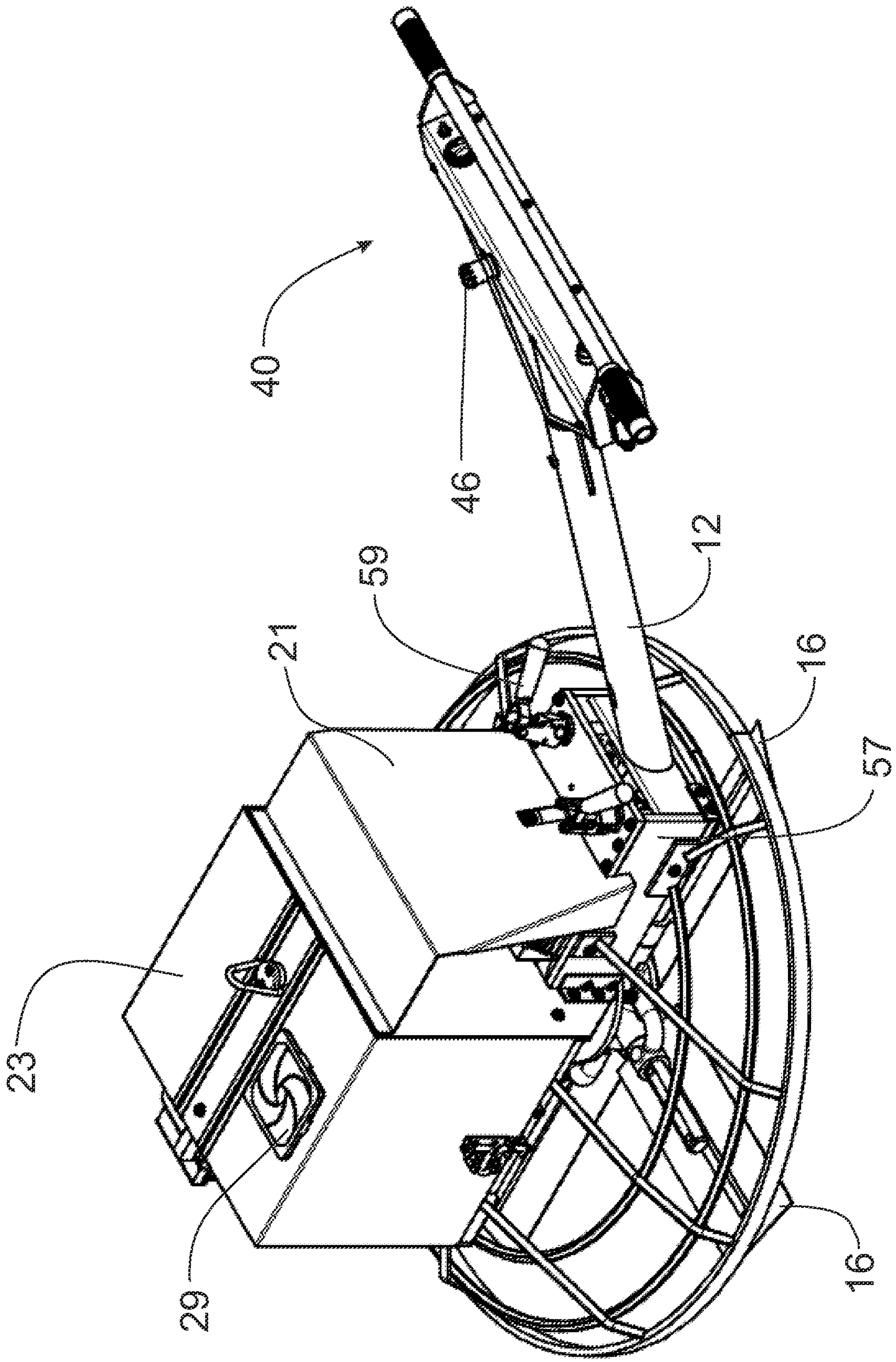
FIG. 3 is a left, rear perspective view of the troweling machine shown in FIG. 1, the handle being received within the receiver box to permit operation of the troweling machine.
Figure 4:
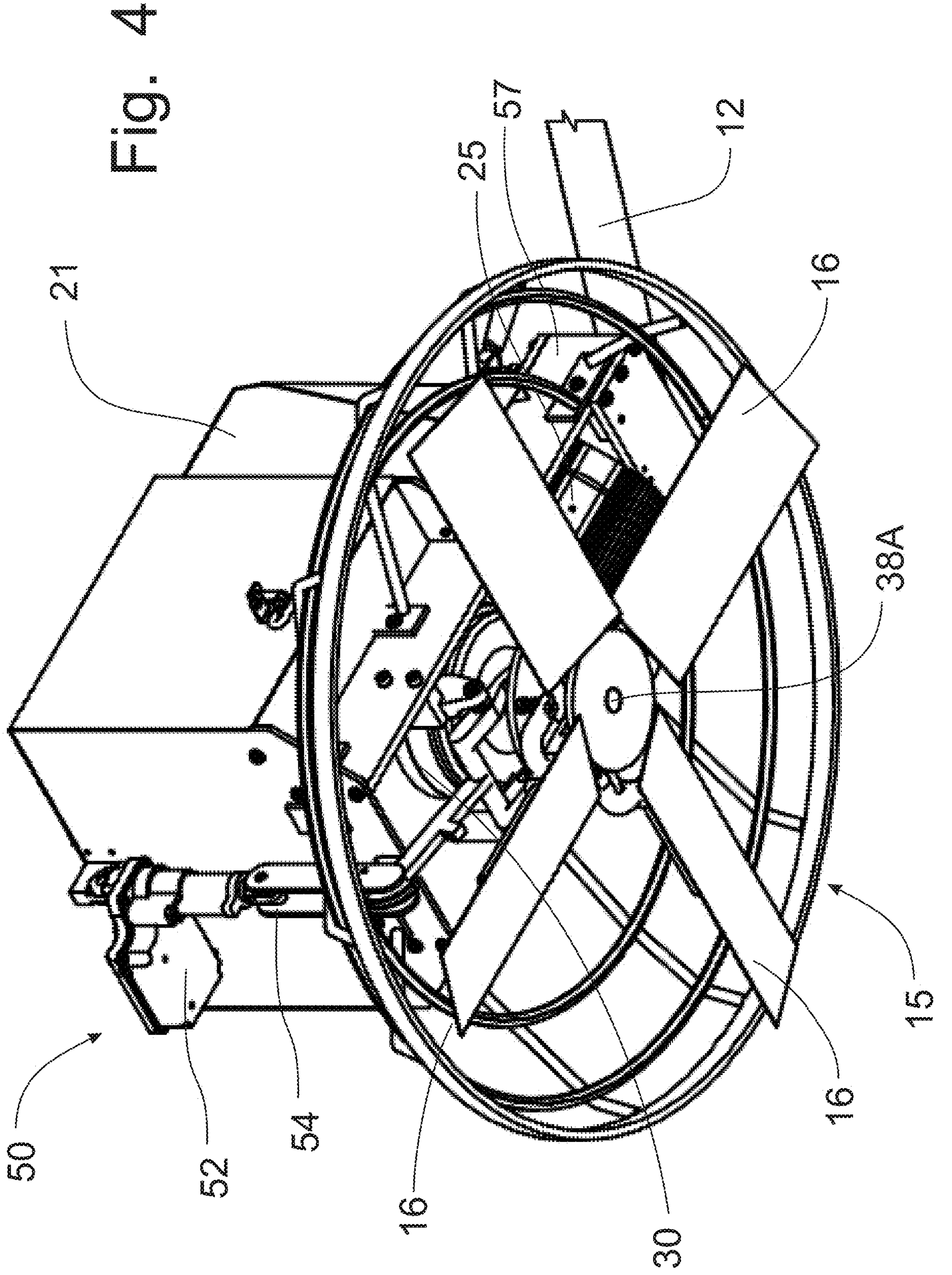
FIG. 4 is a bottom, left perspective view of the troweling machine depicted in FIG. 1.
Figure 5:
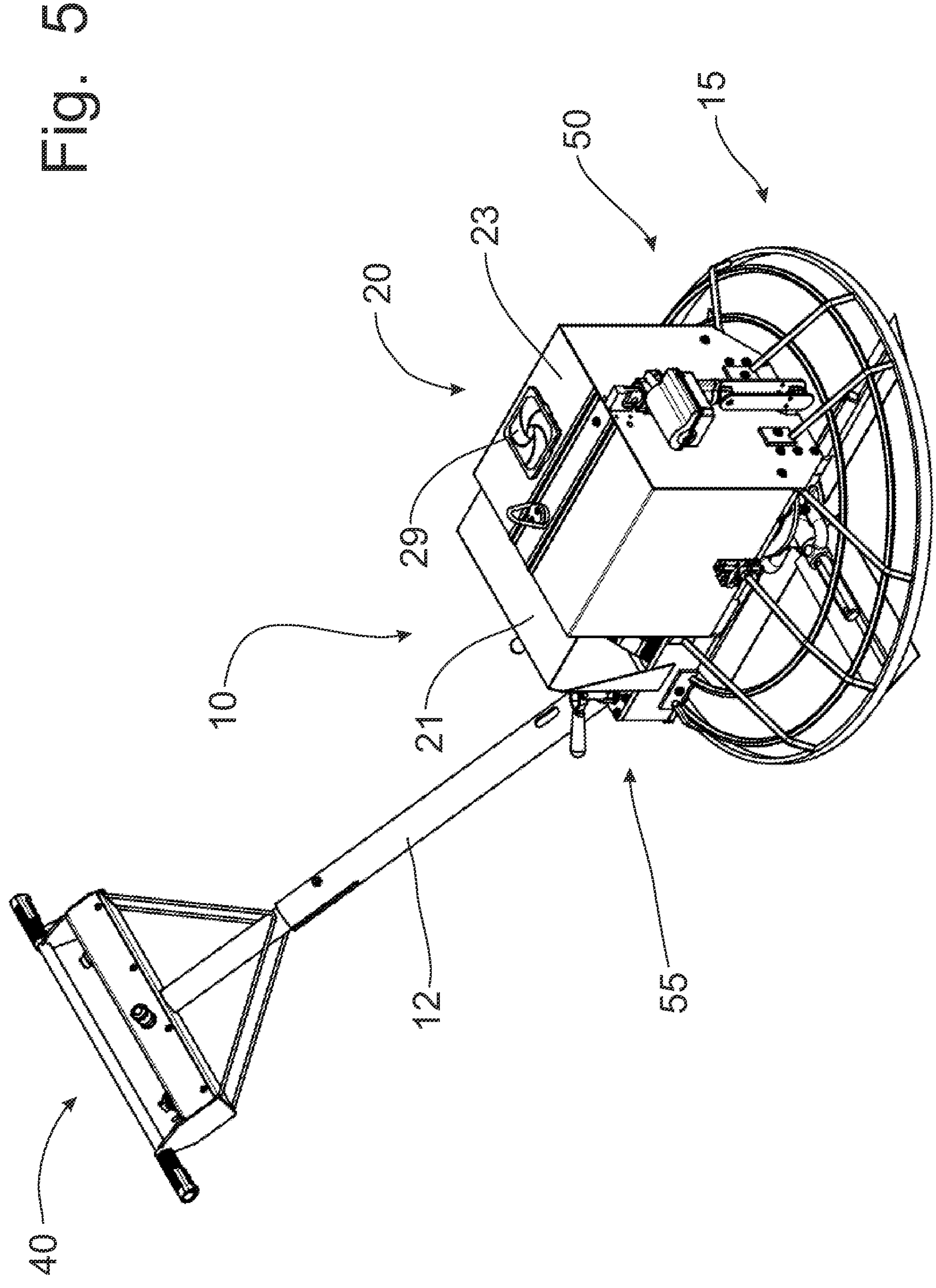
FIG. 5 is a front, right perspective view of the troweling machine depicted in FIG. 1.
Figure 6:
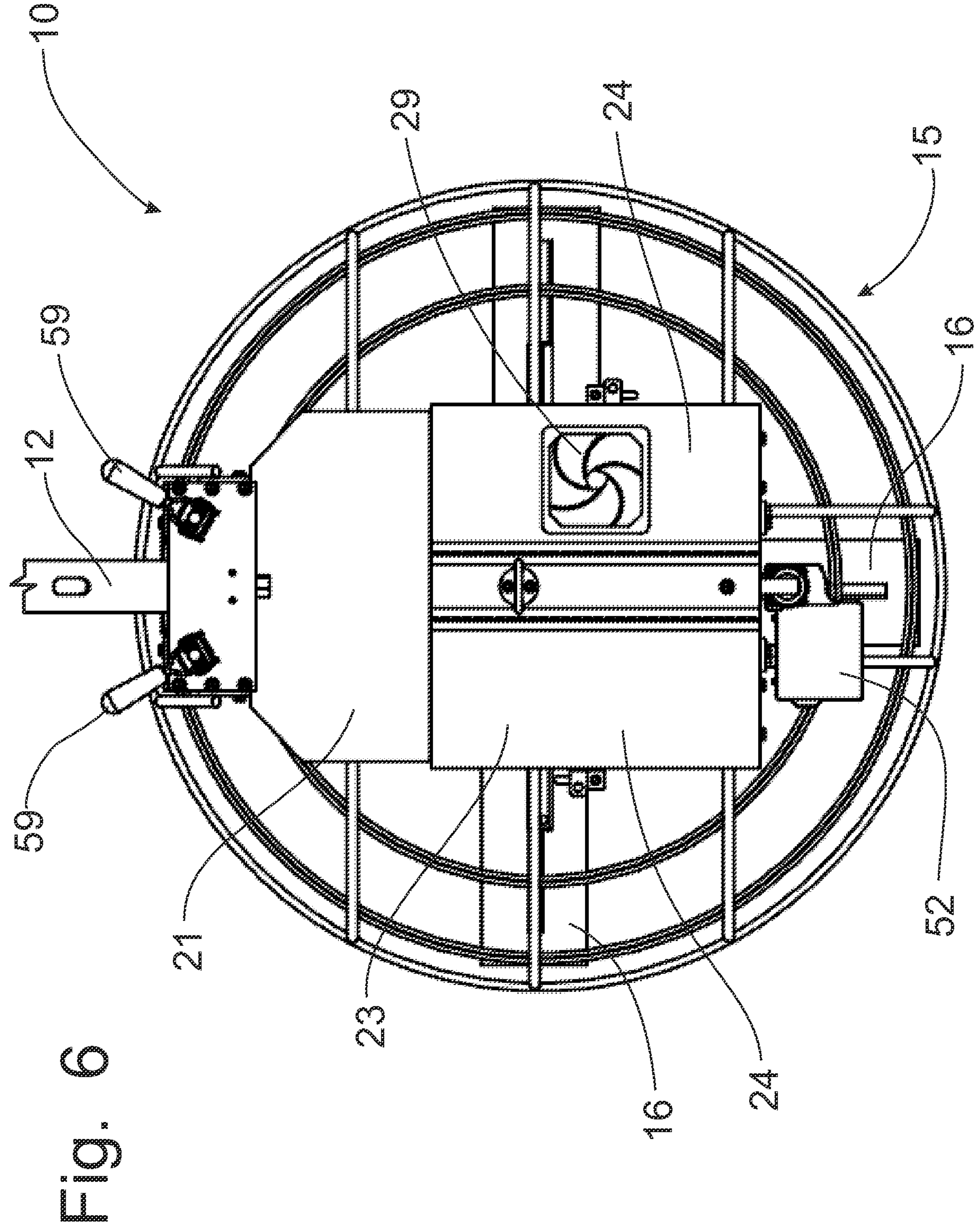
FIG. 6 is a top plan view of the troweling machine depicted in FIG. 1.
Figure 7:
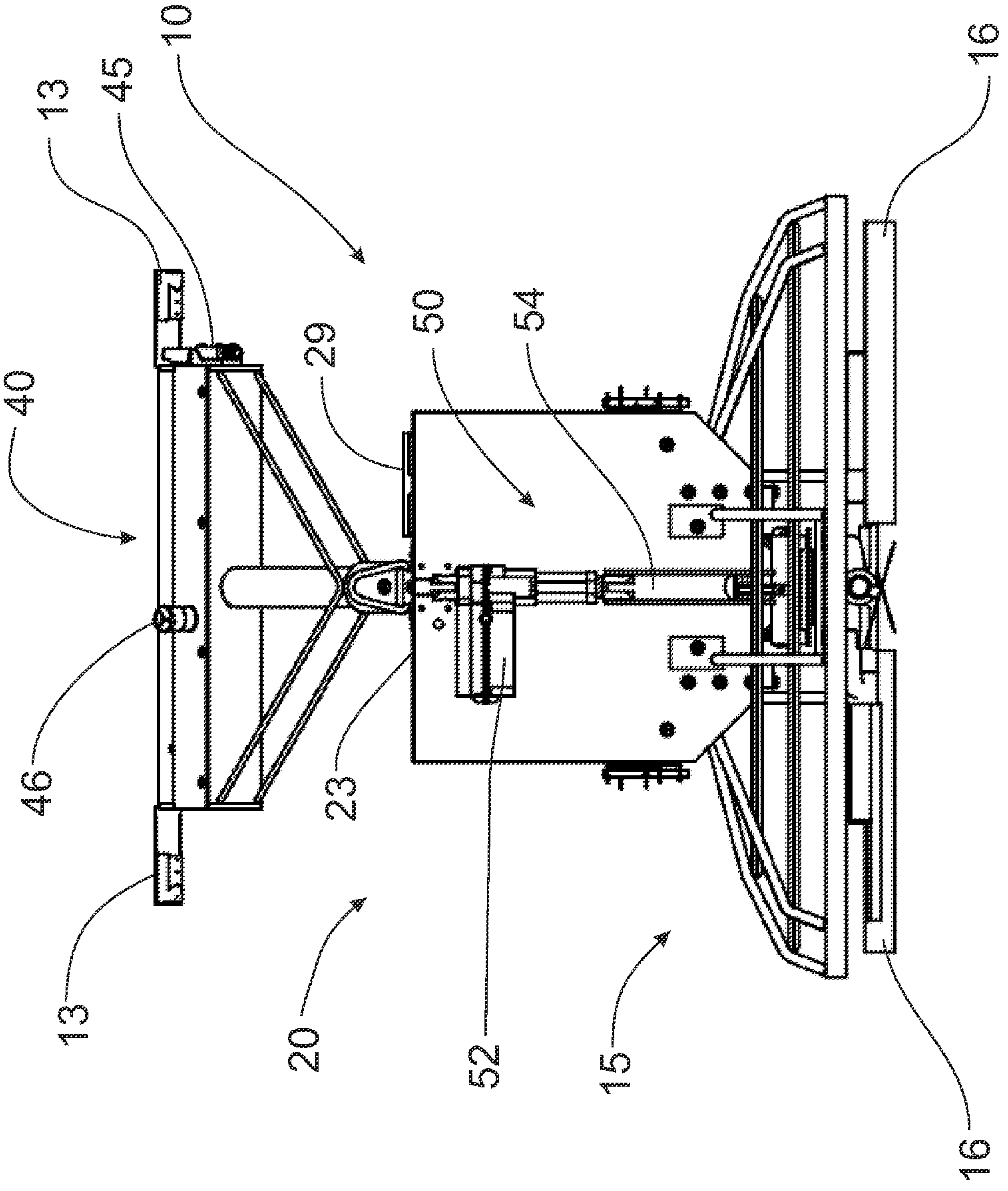
FIG. 7 is a front elevational view of the troweling machine shown in FIG. 1.
Figure 8:
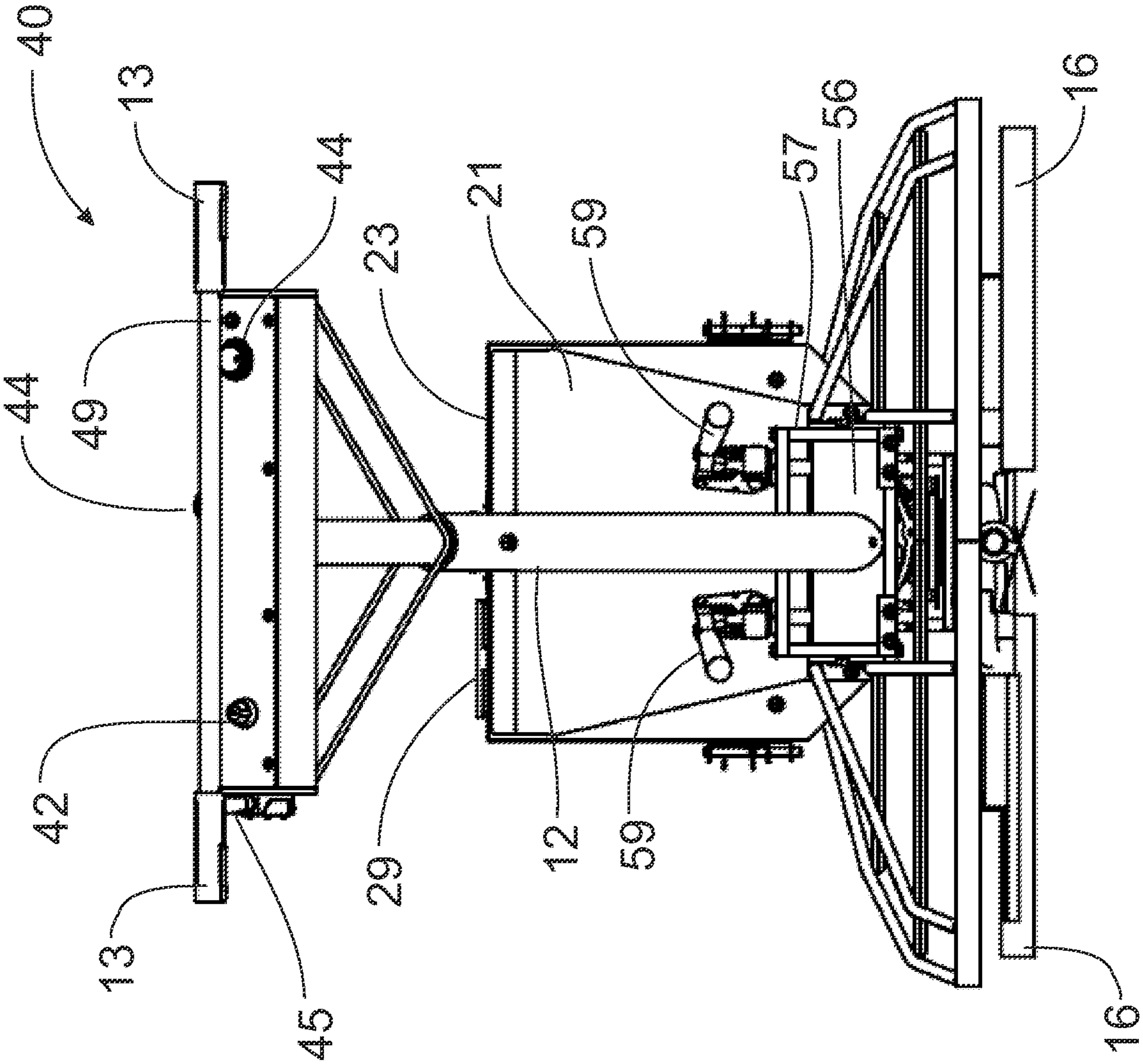
FIG. 8 is a rear elevational view of the troweling machine shown in FIG. 1.

Referring now to FIGS. 1-8, a battery powered, hand-operated troweling machine for finishing recently poured planar concrete structures, such as a floor, and incorporating the principles of the instant invention can best be seen. The troweling machine 10 includes a source of battery power 20 connected via a programmable controller 21 through an electric motor 25 and a gearbox 30 to a blade assembly 15 to drive the rotation of the blade assembly 15. The troweling machine 10 is manipulated by an operator using a rearwardly extending handle 12 having mounted thereon controls for the operation of the electric motor 25 driving the troweling machine 10. The power source 20 preferably includes a pair of twenty-four volt batteries connected in series to provide a forty-eight volt power source.

The electrical current from the power source 20 is delivered to a programmable controller 21 operably connected to the controls 40 and powers the rotation of an electric motor 25, as will be described in greater detail below. The blade assembly 15 is preferably formed with four individual blades 16 that are rotated about a central axis of rotation corresponding to the drive shaft 38*a* extending downwardly from the gearbox 30. The blade assembly 15 is surrounded by a wire cage 17, as is known in the art. A rearwardly extending handle 12 provided with grips 13 enables the operator to control the operation of the troweling machine 10 and to control the direction of movement thereof.

Figure 9:
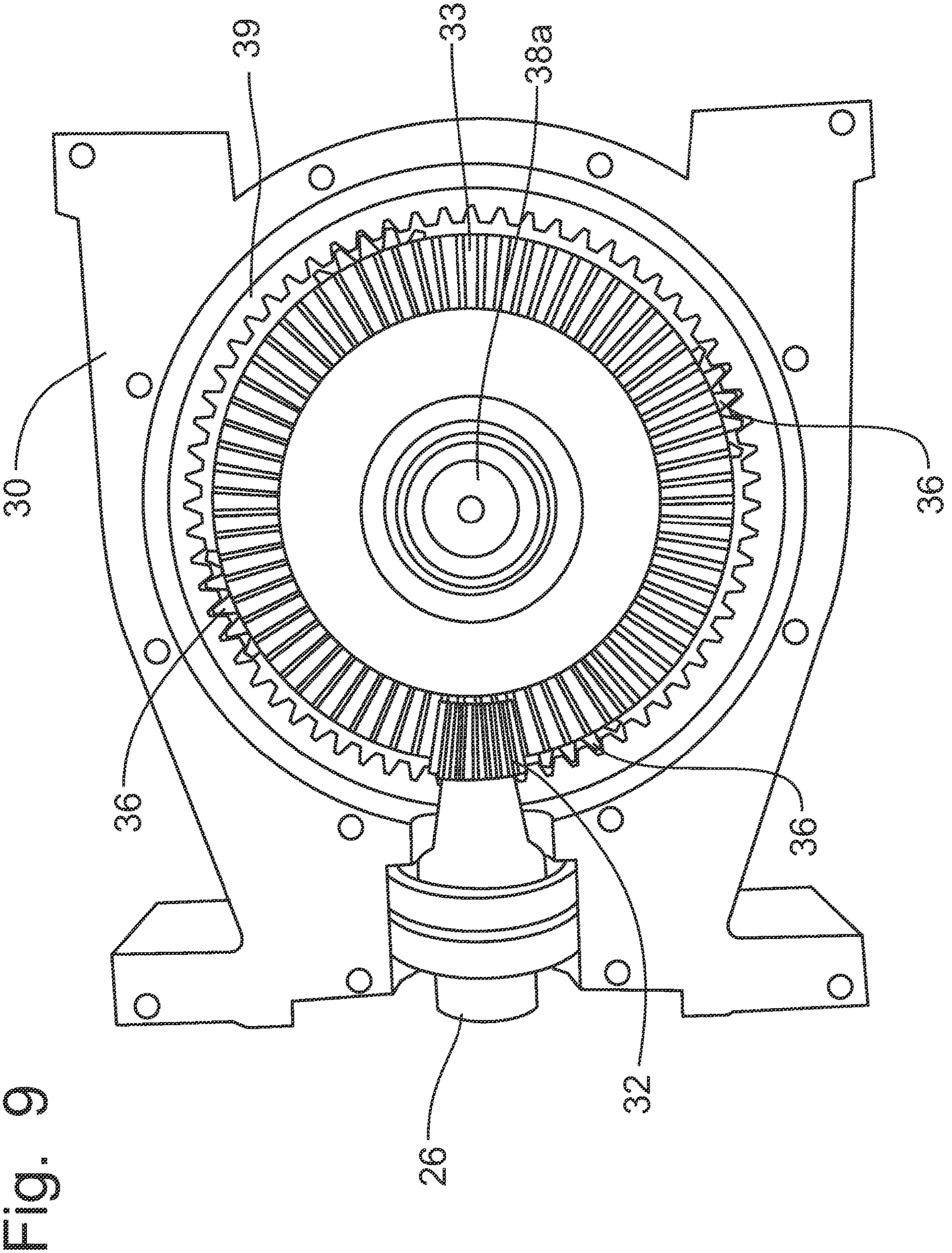
FIG. 9 is a top plan view of the interior of the gearbox depicting the initial drive mechanism, a pinion and ring gear set, with the top of the gearbox removed for purposes of clarity.

The batteries 22 are stored in the housing 23 at the upper portion of the machine 10 and covered by a hinged panel 24. A cooling fan 29 is mounted in the housing 23 to provide an air flow around the batteries during operation. As noted above, the batteries 22 are connected in series to deliver electrical current to an electric motor 25, best seen in FIG. 4. The output shaft 26 of the electric motor 25 delivers rotational power to a gearbox 30, best seen in FIGS. 9 and 9A. The output shaft 26 has a pinion gear 32 at the distal end thereof, which is engaged with a mating rotatable ring gear 33 to cause the rotation of the rotatable ring gear 33 which is rotatably mounted on the upper end of the drive shaft 38*a*. The underside of the rotatable ring gear 33 is formed with a spur gear 34, as shown in dashed lines in FIG. 9A, that engages and drives the rotation of the planetary gear set 35 to provide an increased torque from the battery assembly 20 to the blade assembly 15.

Figure 9A:
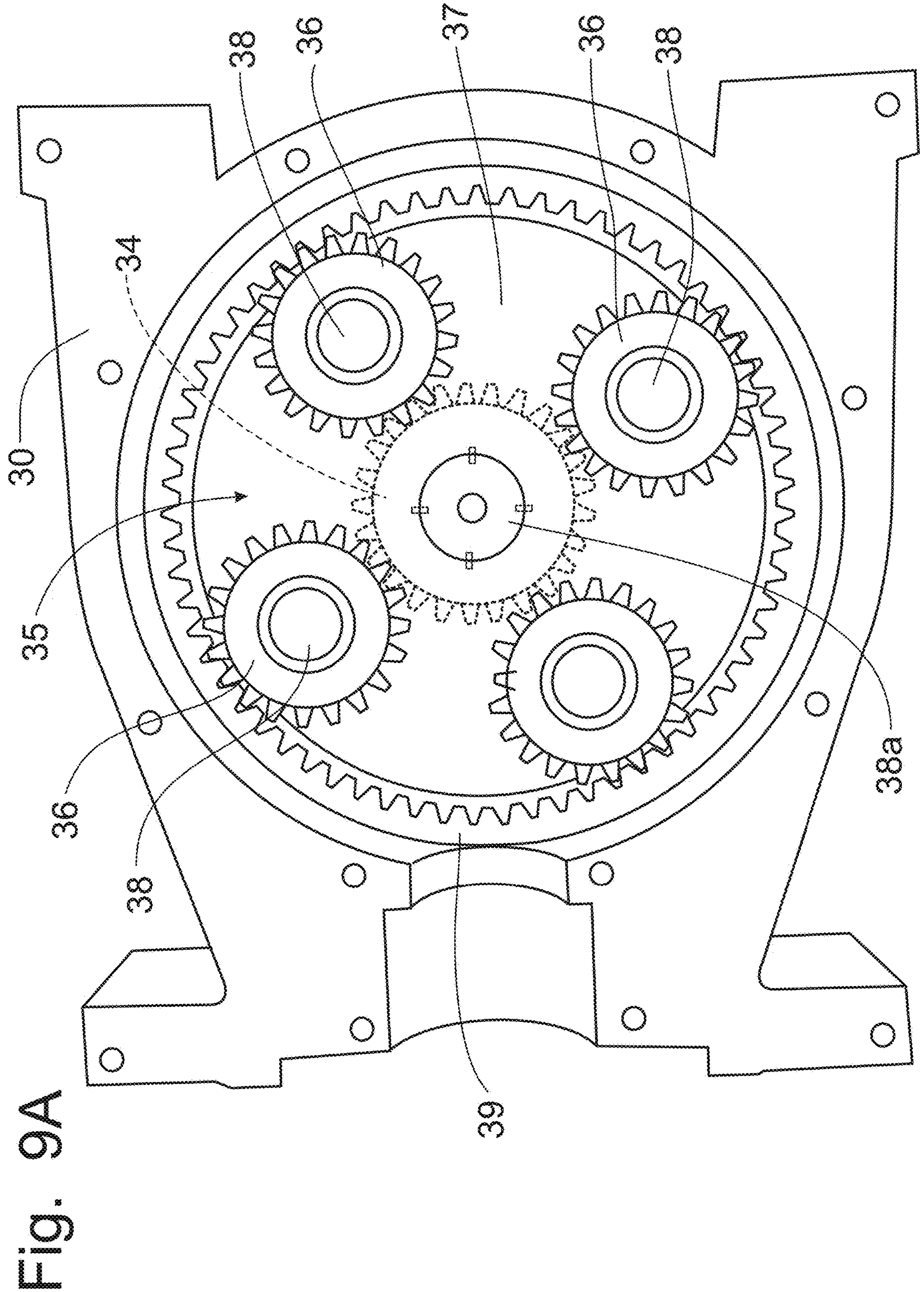
FIG. 9A is a top plan view of the drive mechanism within the gearbox, a planetary gear set, lying immediately beneath the ring gear set shown in FIG. 9.

The planetary gear set 35 is best seen in FIG. 9A and includes four planet gears 36 rotatably supported on the rotatable plate 37 and engaged with a fixed ring gear 39. As shown in FIG. 9A, the plate 37 is formed with a set of four stub shafts 38 secured to the plate 37 and received within the planet gears 36. As the planet gears 36 are rotated by the spur gear 34 on the underside of the rotatable ring gear 33, the planet gears 36 travel around the interior of the fixed sun gear 39 and affect rotation of the rotatable plate 37 through engagement with the stub shafts 38 and, as a result, rotate the drive shaft 38*a* engaged with the blade assembly 15. As would be recognized by one skilled in the art, the rotatable plate 37 is secured to the drive shaft 38*a*, such as by splines or keys, as depicted on FIG. 9A, to affect the rotation of the plate 37 to rotate the blade assembly 15.

Figure 10:
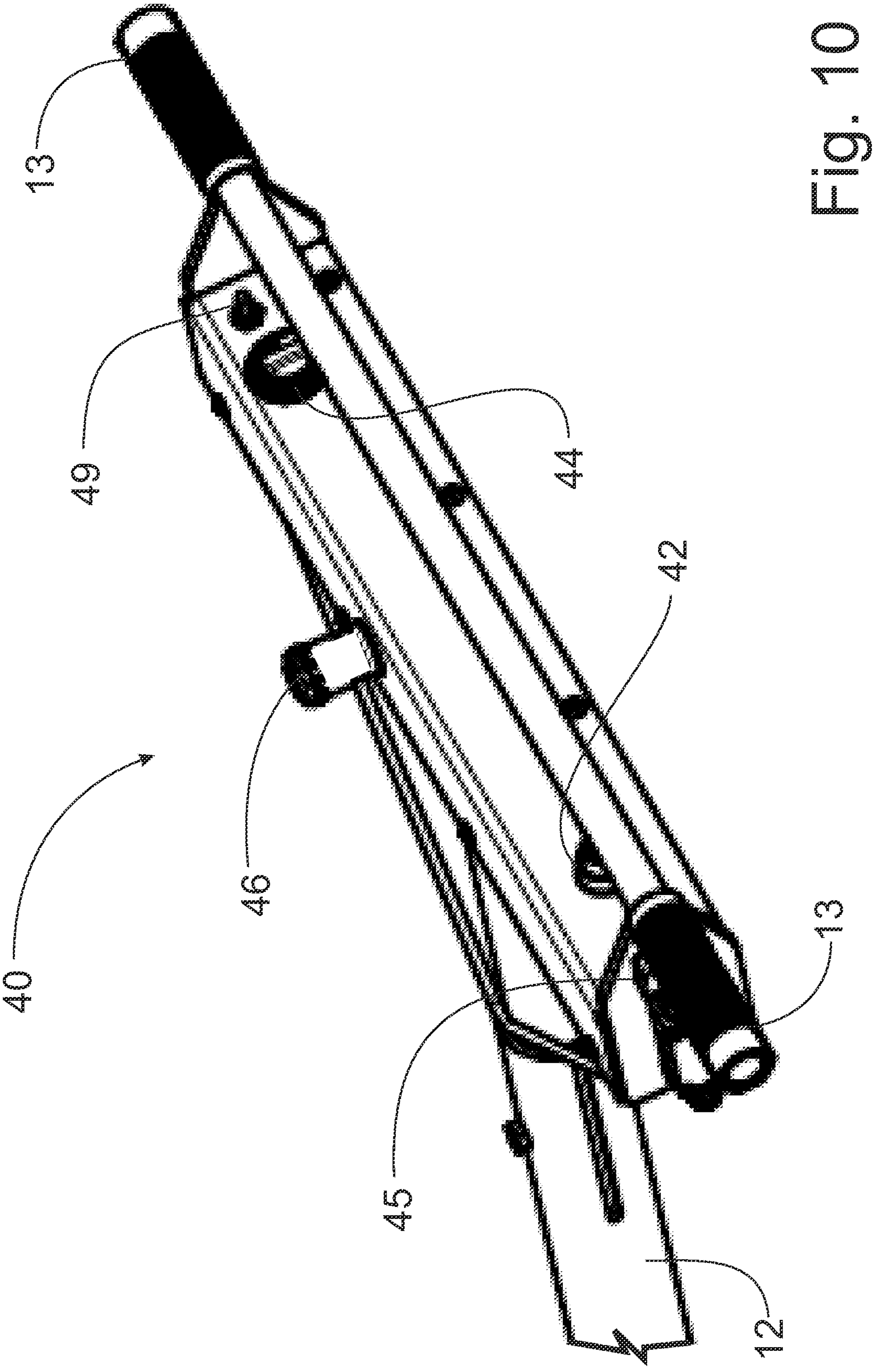
FIG. 10 is an enlarged left, rear perspective view of the control panel carried by the rearward distal end of the handle.

The control panel 40 for operating the troweling machine 10 is best seen in FIG. 10 and is located at the rearward distal end of the handle 12. The handle 12 includes a pair of laterally spaced grips 13 for grasping by the operator to control the movement of the troweling machine 10. The control panel 40 includes a key switch 42 for initiating operation of the troweling machine 10. A rotary knob 44 provides a rheostat for applying electrical current to the electric motor 25 to control the speed of operation of the troweling machine 10. Adjacent the left hand grip 13, a pivoted pad 45 is located to control the application of electrical current to the electric motor 25 to make the troweling machine 10 operate. Centrally located at the top of the control panel 40 is an emergency shut-off knob 46 that is operably coupled to a solenoid (not shown) and will disconnect the transmission of electrical current to the electric motor 25. To the right of the rotary knob 44 a toggle switch 49 is positioned for activating the blade tilt mechanism 50 described in greater detail below.

Referring now to FIGS. 1, 2, 4 and 7, the toggle switch 49 activates the operation of the blade tilt mechanism 50 which is driven by a compact electric actuator 52 powered by the battery assembly 20 and positioned on the front side of the housing 23. The actuator 52 is operable to pull on a linkage mechanism 54 in response to the manipulation of the toggle switch 49 to move a conventional tilt apparatus (not shown) that is associated with the blade assembly 15 to tilt the blades 16 about a horizontal pivot axis extending radially from the blade assembly 15 and establish the strike angle desired by the operator.

Figure 11:
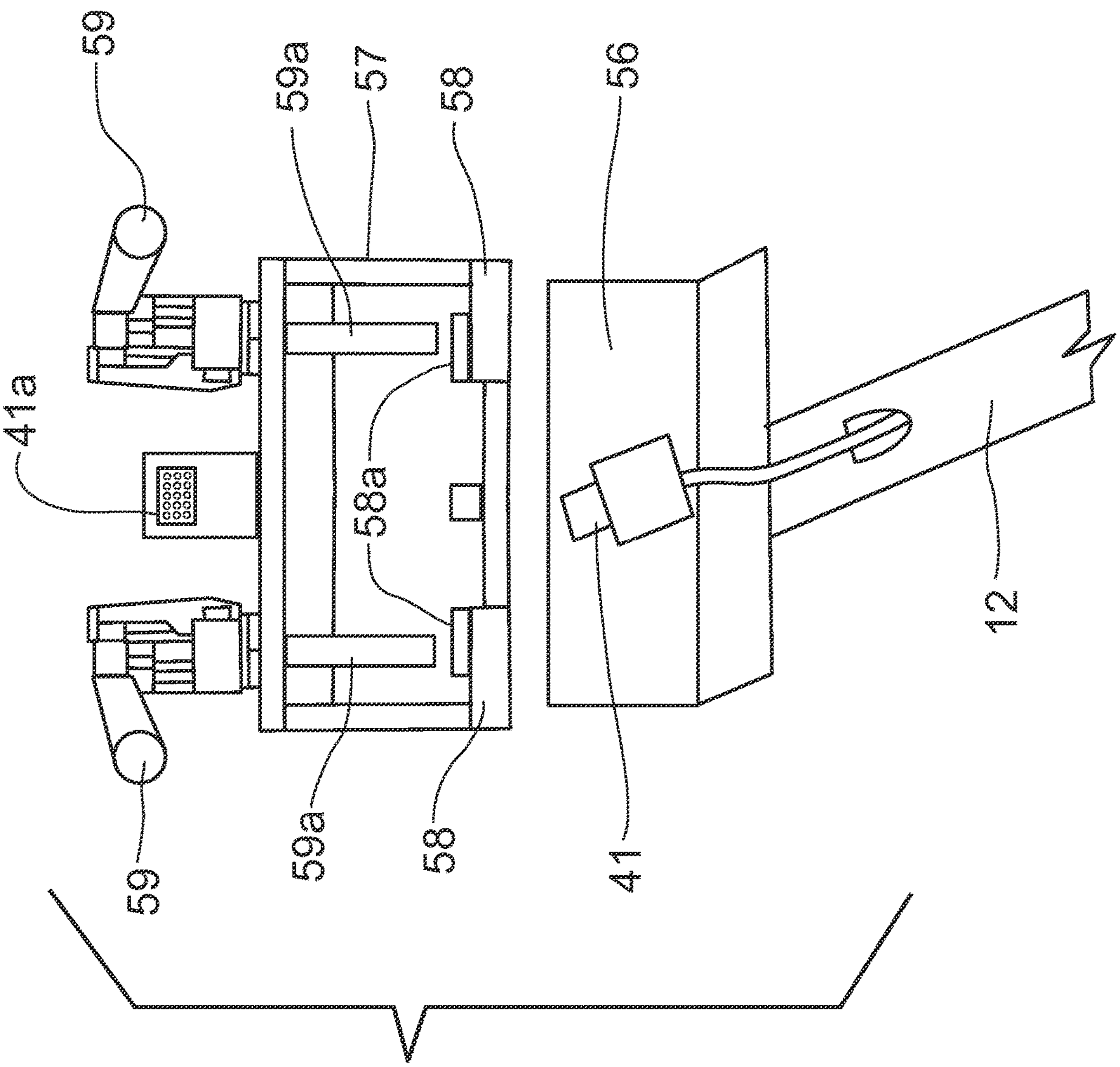
FIG. 11 is a schematic rear elevational view of the receiver box for detachably connecting the handle to the frame of the troweling machine, the L-shaped bracket of the handle and the detachable plug for the controls being detached from the body of the troweling machine.

Referring now to FIG. 11, an apparatus 55 for detachably mounting the handle 12 to the troweling machine 10 can best be seen. Because the handle 12 projects rearwardly from the body of the troweling machine 10, transportation and storage of the troweling machine 10 can be cumbersome. Accordingly, providing for the selective detachment of the handle 12 from the body of the troweling machine 10 would permit a compact transportation and storage. As best seen in FIG. 11, the end of the handle 12 engaged with the body of the troweling machine 10 is formed with an L-shaped bracket 56 that is received within a box-like receiver 57 formed with exterior stops 58 and interior stops 58*a*. The receiver 57 is also formed with a pair of over center clamps 59 that are operable to raise and lower clamping pins 59*a* that press downwardly on the L-shaped bracket 56 to clamp the L-shaped bracket 56 against the receiver 57 when the L-shaped bracket 56 is inserted into the receiver 57 and wedged between the exterior and interior stops 58, 58*a*.

To attach the handle 12, the L-shaped bracket 56 is inserted into the receiver 57 so that the L-shaped bracket 56 is positioned between the exterior and interior stops 58, 58*a*. Then, the over center clamps 59 are depressed toward the receiver 57 to lower the clamping pins 59*a* into engagement with top of the L-shaped bracket 56. The clamping pins 59*a* press the L-shaped bracket 56 against the floor of the receiver 57 where the exterior stops 58 project above the floor of the receiver 57 to prevent the L-shaped bracket 56 from pulling out of the receiver 57, and the interior stops 58*a* prevent the L-shaped bracket 56 from moving inwardly relative to the receiver 57. The controls 40 are connected via a detachable plug 41 operatively engaged with a receiver 41*a* to provide the electrical current to the motor 25.

In operation, the hand-operated troweling machine 10 having a pair of freshly charged twenty-four volt batteries 22 placed internally of the housing 23 is transported to a job site where a recently poured concrete floor requires finishing. The handle 12 is secured to the receiver 57 and clamped into place by the over center clamps 59. The troweling machine 10 is then ready to be placed onto the unfinished surface of the concrete floor. Utilizing the control panel 40 located at the distal operator end of the handle 12, the operator turns the key switch 42 to permit the delivery of electrical power from the batteries 22 to the electric motor 25. The desired speed of operation of the blade assembly 15 is selected by rotating the rotary knob 44 then the pivoted pad 45 adjacent the left hand grip 13 can be depressed to apply the electric current from the batteries 22 to the electric motor 25. Changing the pitch of the individual troweling blades 16 can be easily accomplished by a manipulation of the toggle switch 49 adjacent the speed control knob 44.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A hand-operated troweling machine, comprising:
- a rotatable blade assembly having a plurality of rotatable blades for finishing a recently poured concrete surface;
- an electric motor operably connected to said rotatable blade assembly to drive rotation thereof;
- a gearbox interconnecting said electric motor and said blade assembly, said gearbox having:
  - a housing;
  - a rotatable ring gear rotatably supported in said housing, said ring gear having a spur gear formed on an underside thereof;
  - a pinion gear rotatably driven from said electric motor and being engaged with said rotatable ring gear to affect rotation thereof; and
  - a planetary gear set positioned below said rotatable ring gear and being engaged with said spur gear, said planetary gear set including:
    - a fixed ring gear fixed to said housing;
    - a plurality of planet gears engaged with both said spur gear and with said fixed ring gear such that said planet gears rotate around said fixed ring gear when driven by said spur gear; and
    - a rotatable plate having mounted on one side thereof a plurality of stub shafts on which said planet gears are respectively mounted, and an output shaft projecting downwardly to drive the rotation of said blade assembly;
- a battery assembly electrically coupled with said electric motor to power operation thereof; and
- a control mechanism interconnected between said battery assembly and said electric motor to control the operation of said electric motor.

2. The hand-operated troweling machine of claim 1 wherein said battery assembly comprises a pair of twenty-four volt batteries connected in parallel to said electric motor.

3. The hand-operated troweling machine of claim 1 wherein said control mechanism includes:
- a key switch to activate the control system;
- a speed control for selectively varying the rotational speed of the blade assembly during operation; and
- an actuator control for applying electrical current to said electric motor to power the rotation of the blade assembly.

4. The hand-operated troweling machine of claim 1 further comprising an electric blade tilt apparatus, said control mechanism further including a toggle switch for affecting changes in the tilted orientation of the individual blades.

5. The hand-operated troweling machine of claim 1 further comprising a detachable operator handle bearing said control mechanism at a distal operator's end thereof.

6. The hand-operated troweling machine of claim 5 wherein said operator handle is formed with an L-shaped bracket at the proximal end thereof, said L-shaped bracket being engaged into a receiver having exterior and interior stops to prevent the engaged L-shaped bracket from moving forward or rearward relative to the receiver, said receiver also having a clamping apparatus to clamp the L-shaped bracket against the receiver.

7. A hand-operated troweling machine, comprising:
- a rotatable blade assembly having a plurality of rotatable blades for finishing a recently poured concrete surface;
- an electric motor operably connected to said rotatable blade assembly to drive rotation thereof;
- a gearbox interconnecting said electric motor and said blade assembly, said gearbox including:
  - a housing;
  - a ring gear rotatably supported in said housing, said ring gear having a spur gear formed on an underside thereof;
  - a pinion gear rotatably driven from said electric motor and being engaged with said ring gear to affect rotation thereof; and
  - a planetary gear set positioned below said ring gear and being engaged with said spur gear for driving rotation of a rotatable plate having an output shaft projecting therefrom to drive the rotation of said blade assembly;
- a battery assembly electrically coupled with said electric motor to power operation thereof; and a control mechanism interconnected between said battery and said electric motor to control the operation of said troweling machine.

8. The hand-operated troweling machine of claim 7 wherein planetary gear set comprises:

a fixed ring gear fixed to said housing; and a plurality of planet gears engaged with both said spur gear and with said fixed ring gear such that said planet gears rotate around said fixed ring gear when driven by said spur gear, said rotatable plate having a plurality of stub shafts on which said planet gears are respectively mounted to drive rotation of said rotatable plate with the rotation of the planet gears around said fixed ring gear.

9. The hand-operated troweling machine of claim 8 wherein said battery assembly comprises a pair of twenty-four volt batteries connected in parallel to said electric motor.

10. The hand-operated troweling machine of claim 7 further comprising a detachable operator handle bearing said control mechanism at a distal operator's end thereof, said operator handle being formed with an L-shaped bracket at the proximate end thereof, said L-shaped bracket being engaged into a receiver having exterior and interior stops to prevent the engaged L-shaped bracket from moving forward or rearward relative to the receiver, said receiver also having a clamping apparatus to clamp the L-shaped bracket downwardly against the receiver.

11. The hand-operated troweling machine of claim 10 further comprising a blade tilt apparatus including:

an electrically powered actuator coupled to a toggle switch; and a linkage system secured to said actuator and being operably connected to said blade assembly to shift a tilt orientation of the individual blades and establish a tilt angle of the blade relative to the concrete surface, said control mechanism including said toggle switch for affecting changes in the tilted orientation of the individual blades.

12. A hand-operated troweling machine, comprising:

a rotatable blade assembly having a plurality of rotatable blades for finishing a recently poured concrete surface, each said blade being pivotable about a horizontal pivot axis extending radially from said blade assembly, the pivotal movement of said blades being operable to vary a strike angle at which each respective blade engages the concrete surface;

an electric motor operably connected to said rotatable blade assembly to drive rotation thereof;

a gearbox interconnecting said electric motor and said blade assembly to increase the torque applied to said blade assembly from said electric motor, said gearbox including:

a housing;

a rotatable ring gear rotatably supported in said housing, said rotatable ring gear having a spur gear formed on an underside thereof;

a pinion gear rotatably driven from said electric motor and being engaged with said rotatable ring gear to affect rotation thereof; and a planetary gear set positioned below said rotatable ring gear and being engaged with said spur gear for driving rotation of a rotatable plate having an output shaft projecting therefrom to drive the rotation of said blade assembly;

a battery assembly electrically coupled with said electric motor to power operation thereof and providing at least forty-eight volts of electrical power to said electric motor;

a control mechanism interconnected between said battery assembly and said electric motor to control the operation of said electric motor; and an electric tilt mechanism operably connected to said blade assembly to pivot each said blade about the respective pivot axis and selectively vary the strike angle thereof, said control mechanism including a toggle switch to operate said tilt mechanism.

13. The troweling machine of claim 12 wherein said tilt mechanism comprises:

an actuator powered electrically by said battery assembly and coupled to said toggle switch; and a linkage system secured to said actuator and being operably connected to said blade assembly to pivot each blade about its respective pivot axis to vary the strike angle of the individual blades.

14. The troweling machine of claim 12 wherein said battery assembly includes two twenty-four volt batteries electrically connected in series to provide a forty-eight volt battery system.

15. The troweling machine of claim 12 wherein said planetary gear set comprises:

a fixed ring gear fixed to said housing;

a plurality of planet gears engaged with both said spur gear and with said fixed ring gear such that said planet gears rotate around said fixed ring gear when driven by said spur gear; and a rotatable plate having one an upper side thereof a plurality of stub shafts on which said planet gears are respectively mounted, and an output shaft projecting downwardly to drive the rotation of said blade assembly.

16. The troweling machine of claim 12 further comprising a detachable operator handle bearing said control mechanism at a distal operator's end thereof, said operator handle being formed with an L-shaped bracket at the proximal end thereof, said L-shaped bracket being engaged into a receiver having exterior and interior stops to prevent the engaged L-shaped bracket from moving forward or rearward relative to the receiver, said receiver also having a clamping apparatus to clamp the L-shaped bracket downwardly against the receiver.

17. The troweling machine of claim 12 wherein said control mechanism further includes:

a key switch to activate the control system;

a speed control for selectively varying the rotational speed of the blade assembly during operation by varying the electrical power delivered from the battery assembly to the electric motor; and an actuator control for applying electrical current to said electric motor to power the rotation of the blade assembly.

* * * * *